(12) United States Patent
Barnhart et al.

(10) Patent No.: US 11,661,217 B2
(45) Date of Patent: May 30, 2023

(54) MULTI-ARMED SOFT CAPTURE SYSTEM

(71) Applicant: UNIVERSITY OF SOUTHERN CALIFORNIA, Los Angeles, CA (US)

(72) Inventors: David Barnhart, Los Angeles, CA (US); Rebecca Rogers, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 246 days.

(21) Appl. No.: 17/035,329

(22) Filed: Sep. 28, 2020

(65) Prior Publication Data

US 2021/0094709 A1    Apr. 1, 2021

Related U.S. Application Data

(60) Provisional application No. 62/906,630, filed on Sep. 26, 2019.

(51) Int. Cl.
| | | |
|---|---|---|
| *B64G 1/64* | (2006.01) | |
| *B25J 15/00* | (2006.01) | |
| *B64G 4/00* | (2006.01) | |

(52) U.S. Cl.
CPC ............ *B64G 1/648* (2013.01); *B25J 15/008* (2013.01); *B64G 1/646* (2013.01); *B64G 4/00* (2013.01); *B64G 2004/005* (2013.01)

(58) Field of Classification Search
CPC .......... B64G 1/646; B64G 1/648; B64G 4/00; B64G 2004/005; B25J 15/008
USPC ....................................................... 244/172.4
See application file for complete search history.

(56) References Cited

U.S. PATENT DOCUMENTS

| | | | | |
|---|---|---|---|---|
| 4,712,753 A | * | 12/1987 | Howard ................. | B64G 1/646 244/116 |
| 5,279,482 A | * | 1/1994 | Dzenitis ................. | B64G 1/648 473/576 |
| 6,655,637 B1 | * | 12/2003 | Robinson ............... | B64G 1/646 244/172.4 |
| 2010/0193640 A1 | * | 8/2010 | Atmur .................... | B64G 1/242 244/158.2 |
| 2013/0140403 A1 | * | 6/2013 | Goff ....................... | B64G 1/646 244/172.4 |
| 2014/0064905 A1 | * | 3/2014 | Prahlad ................. | H02N 13/00 414/800 |

* cited by examiner

*Primary Examiner* — Brady W Frazier
(74) *Attorney, Agent, or Firm* — Snell & Wilmer LLP (57) ABSTRACT

Systems and methods for multi-armed robotic capture devices are disclosed. The systems and methods for multi-armed robotic capture devices include a base that is configured to attach to a robotic arm or a servicer and having a tether. The systems and methods for multi-armed robotic capture devices include a body that is coupled to the base via the tether. Additionally, the systems and methods for multi-armed robotic capture devices include a plurality of tentacles coupled to the body and configured to grip a target object. The systems and methods for multi-armed robotic capture devices also include a plurality of tiles positioned on each tentacle of the plurality of tentacles and configured to apply a shear force on the target object to grip the target object using an adhesive force.

16 Claims, 9 Drawing Sheets

MULTI-ARMED SOFT CAPTURE SYSTEM

CROSS-REFERENCE TO RELATED APPLICATION

This application claims priority to U.S. Provisional Application No. 62/906,630, filed Sep. 26, 2019, and entitled MULTI-ARMED SOFT CAPTURE SYSTEM, the contents of which are hereby incorporated herein by reference, to the extent such contents do not conflict with the present disclosure.

STATEMENT AS TO FEDERALLY SPONSORED RESEARCH

This invention was made with government support under contract number 140D0418C0006 awarded by the Defense Advanced Research Projects Agency (DARPA). The government has certain rights in this invention.

TECHNICAL FIELD

The present disclosure relates to orbital satellite and/or space platforms, and in particular to orbital satellite and/or space platforms that use active and/or passive adhesive technology.

BACKGROUND

As the commercial space sector embark upon the advent of servicing activities in space, ubiquitous, easy to use and successful methods that enable safe grasping will be required. Multiple scenarios for services in space contemplate rendezvous and eventual dock or contact with another object, either cooperative or non-cooperative (i.e. working with a limited or non-operational satellite or object). Contact between two disparate entities in space has a higher than normal level of potential inadvertent mechanical contact risk because of the micro-gravity environment (as opposed to the ocean or air where there is still a medium to provide friction and thus a corresponding backing force). Current on-orbit operations that involve Rendezvous and Proximity Operations (RPO) resulting in contact are both an intensive activity from the ground and a costly one on spacecraft systems requirements for the rendezvous. The requirement to safely avoid collision may cause this spacecraft to have complex attitude control systems, sensors, and dedicated proximity measurement devices. The operations themselves are labor intensive with checks and counter checks on the ground before the RPO event occurs. This is inefficient for non-cooperative rendezvous, which may require even more stringent requirements on the spacecraft control system. Attempting to dock with a slowly spinning and nutating body that has no control (as is the case with large dead satellites or rocket bodies, or future cargo containers that have lost control) is a very risky task. The closing spacecraft may not only have traditional rendezvous and proximity sensors, but it may also have the ability to match the nutation and specific rotation parameters of the Client object, thus expending even further fuel and requiring a level of robustness in attitude control in its own system to mitigate failures or offsets. To-date contact solutions have focused on robotic elements that have levels of compliance relative to offsets in rotation or velocity between two objects. The torque and stress applied to the joints is sized to a rotation rate with compliance, which drives the mass of the overall robotic arm. If an object is rotating faster than the designed grasping specifications of the joints, the robotic arm cannot be used. Traditional docking/contact systems are mechanical; that is, they are designed to provide limited amounts of off-nominal compliance to errors in contact velocity or angle and maximize control in the grapple/contact. Compliance is something assigned to the robotic arm that holds a mechanical contact and is either software or hardware implemented.

A solution that addresses a number of challenges in rendezvous and docking would have as its primary attribute an ability to morph between pure compliance and pure control, as needed, depending upon the specific situation. This type of approach would help current challenges, for example to nullify the need for a Servicer to execute potential high risk/cost maneuvers for a spinning platform, lower the guidance requirements for very low error upon final approach, and have the ability to reach beyond a traditional mechanical contact arm before making final approach. This system would need to be flexible for multiple geometries, scaleable to different sizes, minimize power consumption, and be extremely compact to reduce weight and volume to pack on-board a spacecraft. For inspiration on such a system, we turned to biology.

SUMMARY

A multi-armed robotic capture device, including a base that is configured to attach to a robotic arm or a servicer and having a tether. The multi-armed robotic capture device, including a body that is coupled to the base via the tether. The multi-armed robotic capture device also including a plurality of tentacles coupled to the body and configured to grip a target object and a plurality of tiles positioned on each tentacle of the plurality of tentacles and configured to apply a shear force on the target object to grip the target object using an adhesive force.

A robotic capture device, including a base that is configured to attach to a servicer and having a tether. The robotic capture device, including a body that is coupled to the base via the tether. The robotic capture device also including one or more tentacles coupled to the body and configured to provide grip to a space object. Additionally, the robotic capture device, including one or more tiles positioned on each tentacle of the one or more tentacles and configured to apply a shear force on the space object to grip the space object using an adhesive. The robotic capture device, also including a processor coupled to the base, the body and one or more tentacles and configured to: move or position the one or more tentacles based on shear forces on the space object.

BRIEF DESCRIPTION OF THE DRAWINGS

With reference to the following description and accompanying drawings.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, the connecting lines shown in various figures contained herein are intended to represent exemplary functional relationships and/or physical couplings between various elements. It should be noted that many alternative or additional functional relationships or physical connections may be present in systems for orbital satellite and/or space platforms that use active and/or passive adhesive technology. The systems for orbital satellite and/or space platforms that use active and/or passive adhesive technology may include electro-adhesive or gecko adhesive technology (EA/G), to facilitate grasping of objects in space including minimizing debris generation and "hard" physical contact is described herein.

The systems and methods described herein generally relate to a multi-armed soft capture system. The multi-armed soft capture system may also be referred to as Reactive Electro-Adhesive Capture ClotH Mechanism to Enable Safe Grapple of Cooperative/Non-Cooperative Space Debris (REACCH).

One goal of the systems and methods described herein is to create an easily deployable, smart low mass/cost mechanism that replaces the need for very high cost/risk contact docking, to enable capture of any object (cooperative and/or non-cooperative) in space. In an example embodiment, the systems and methods described herein may utilize low power high grip Electro-Adhesive/Gecko (EA/G) adhesion technology coupled with elastic substrates for ubiquitous geometric compliant grasping. Historically, capture is executed through pre-defined and mechanically fixed controlled contact methods or via uncontrolled methods such as nets. Our mechanism allows for a new solution that can accommodate any requirements for on-orbit servicing/construction and grapple. The proposed architecture, if employed, will be among the first technology to service satellites without the use of a pre-existing docking interface. The level of dynamic, flexible grip capability enabled by the systems and methods described herein may expand the type of objects that can be captured, in their material composition, surface contiguity, and overall geometry, as well as in their orientation and attitude motion on orbit. The on-demand soft capture methodology through multiple contact arms would support a variety of distinct functions for safe space servicing including contact/grapple of cooperative satellite Clients for hand off, object anchoring for temporary stability, and debris capture of selected Client bodies.

While nature provides a plethora of interesting options to inspire a combined compliant/controlled mechanism, one particular natural element seemed to have the most flexibility and ability to realize in early engineering prototypes— that is the simple eight-limbed mollusk or octopus.

The Octopus has a unique mechanism through its soft main body and 8 tentacles that provides both highly flexible movement and compliance to fit into tight spaces, and at the same time can control its tentacles to provide structural/mechanical rigidity for complex tasks of opening or gripping. It also has distinct features embedded in the tentacles for gripping through circular suckers that can serve as both sensing devices for the surface of an object it touches and providing direct shear and normal force transference when engaged on a surface. These two attributes translated into a combined compliance and control mechanism for investigation into satellite grasping and gripping, which formed the basis for various example embodiment of the systems and methods described herein.

A combined compliant/controlled gripper may need new methods for a set of consistent metrics to show value or gauge its effectiveness. Just as an octopus uses its tentacles in a multitude of applications, a morphing compliant/controlled mechanism for Space should have flexibility to move within the fully compliant and fully controllable spectrum. While normal to define each in singular values (i.e. length of stretch or amount of area a system can cover for compliance, or force required to maintain control), it is possible to consider a combined metric that also measures one additional variable in addition to compliance and control. Much of the data that was gathered in testing the first iteration of the systems and methods described herein was in an attempt to develop appropriate metrics and thus be able to compare the system against other grippers/grabbers/docking systems that use robotic arms. The premise is that by having a robotic system that can connect soft compliant and stretchable contact structures to a body in orbit, with the ability to rigidize that contact upon command or sense, then it could greatly expand the ability to safely and effectively execute structural manipulations and RPO/docking options on-orbit.

Figure 1:
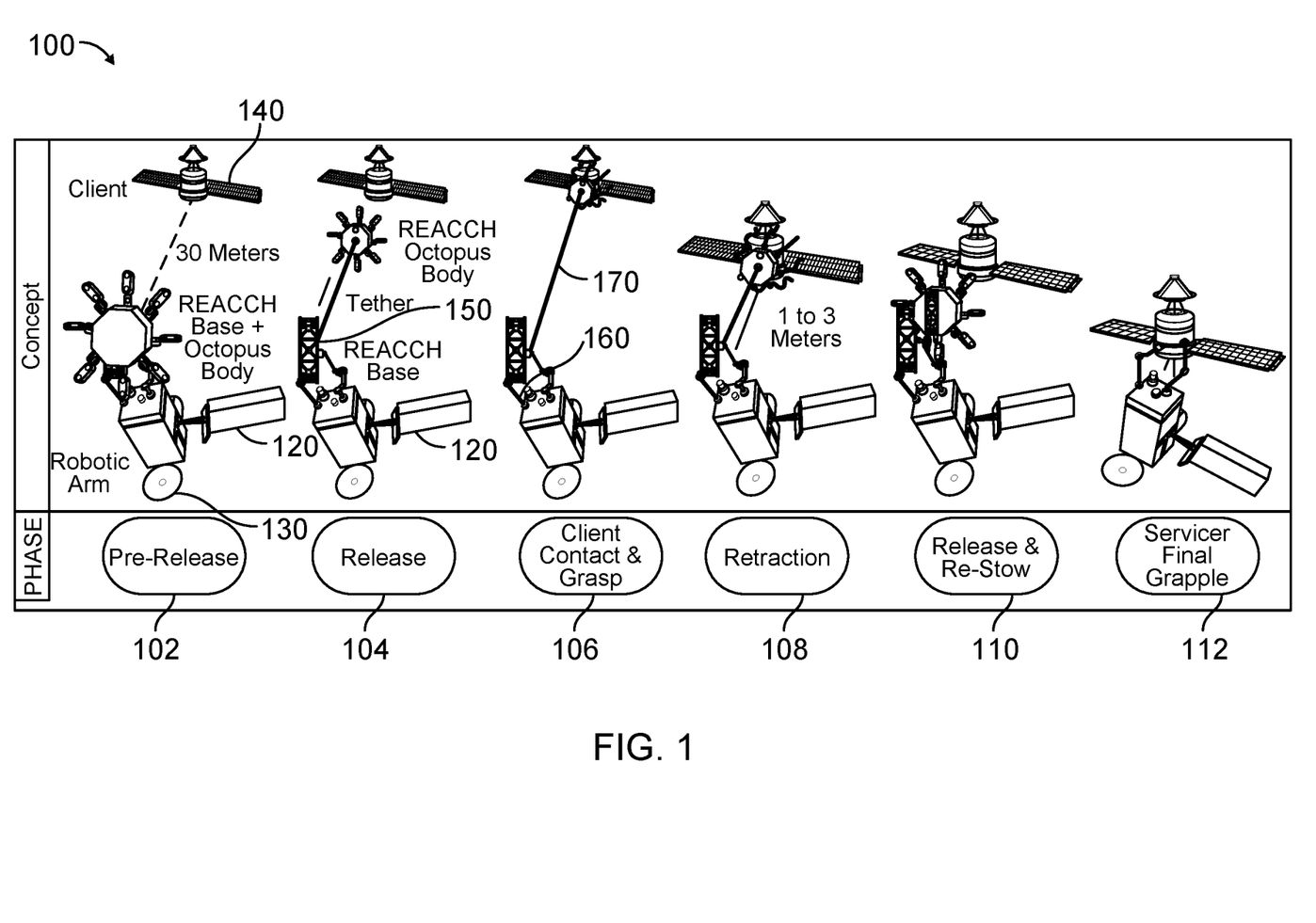
FIG. 1 illustrates an exemplary method of a multi-armed robotic capture device in accordance with the systems and methods described herein.

The systems and methods described herein are generally expected to complement an existing spacecraft servicing mission through a flexible design compatible with existing robot servicing arms. It is comprised of a body-base structure that operates as an end-effector tool for robotic operations. The body housing may contain electronics such as the high voltage modules, relays, power and communication systems, and a control system. Individual power and data lines will run along each tentacle to connect tiles and sensors back to the centralized control system. Here the base would stay affixed to the robotic arm, and the body would detach from the base and extend out to an object using its cold gas thrusters, a tether module will be used to connect the two via a KEVLAR line. The base housing, still attached to the robotic arm, would then be able to reel in the tentacle body module attached to the Client object. On reaching the base, the tentacle arms will retract to release the Client object. The primary robotic arm would then stow a mechanism incorporating the systems and methods described herein in its payload bay and grab onto the Client object to initiate servicing through traditional direct robotic controlled connection, as illustrated in FIG. 1. The EA/G technologies are placed strategically in the form of tiles throughout the tentacle arms embedded with elastic stretch sensors to provide feedback on load values at each anchor point, thus allowing for smart controls on their connection to any surface.

FIG. 1 illustrates an exemplary method 100 of a multi-armed robotic capture device 120 in accordance with the systems and methods described herein. The multi-armed robotic capture device 120 may be attached to a satellite/space station 130 and may be used to capture a client 140. The client 140 may be a satellite or platform to be serviced. The servicer may be a satellite or platform that provides service, e.g., such as the satellite/space station 130. The multi-armed robotic capture device 120 may include a base, e.g., a spacecraft with mounting ports to hold REACCH mechanism. The multi-armed robotic capture device 120 may include body, e.g., the REACH end effector responsible for performing operation.

In an example method, a pre-release 102 may occur. The pre-release 102 may include various sub-steps, including, but not limited to a robotic arm attaches REACCH as end affecter. An RA deploys the REACCH to a prerelease point, e.g., any point selected for a release to begin. A servicer standing off some pre-determined distance (or within a range of distances), e.g., 30 meters, 0.1 to 100 meters, or any other distance that may be based on a range of a tether of the multi-armed robotic capture device 120. In some examples, the pre-determined distance may be some percentage of the range of the tether, e.g., 0.1% to 99.9%, 10%, 25%, 50%, 75%, or any other suitable range.

A release 104 may occur. The release 104 may include one or more of a REACCH head deploys from body and begins to open the REACCH head's tentacles. The REACCH body maintaining a tethered connection. The servicer/RA maintaining position, e.g., within some predetermined range.

A client contact and grasp 106 may include the REACCH head contacts client 140.

A micro-retraction (retraction 108) may include the head providing a micro-acceleration on tether to retract and a servicer validates client movement at slowest approach velocity.

A release from the client and re-stow of the REACCH 110 may include the REACCH head releases from Client 140 and the head retracting and docking with the body. The servicer RA may re-dock with the REACCH.

The servicer final grapple 112 may include the servicer grapples client with primary RA.

Figure 2:
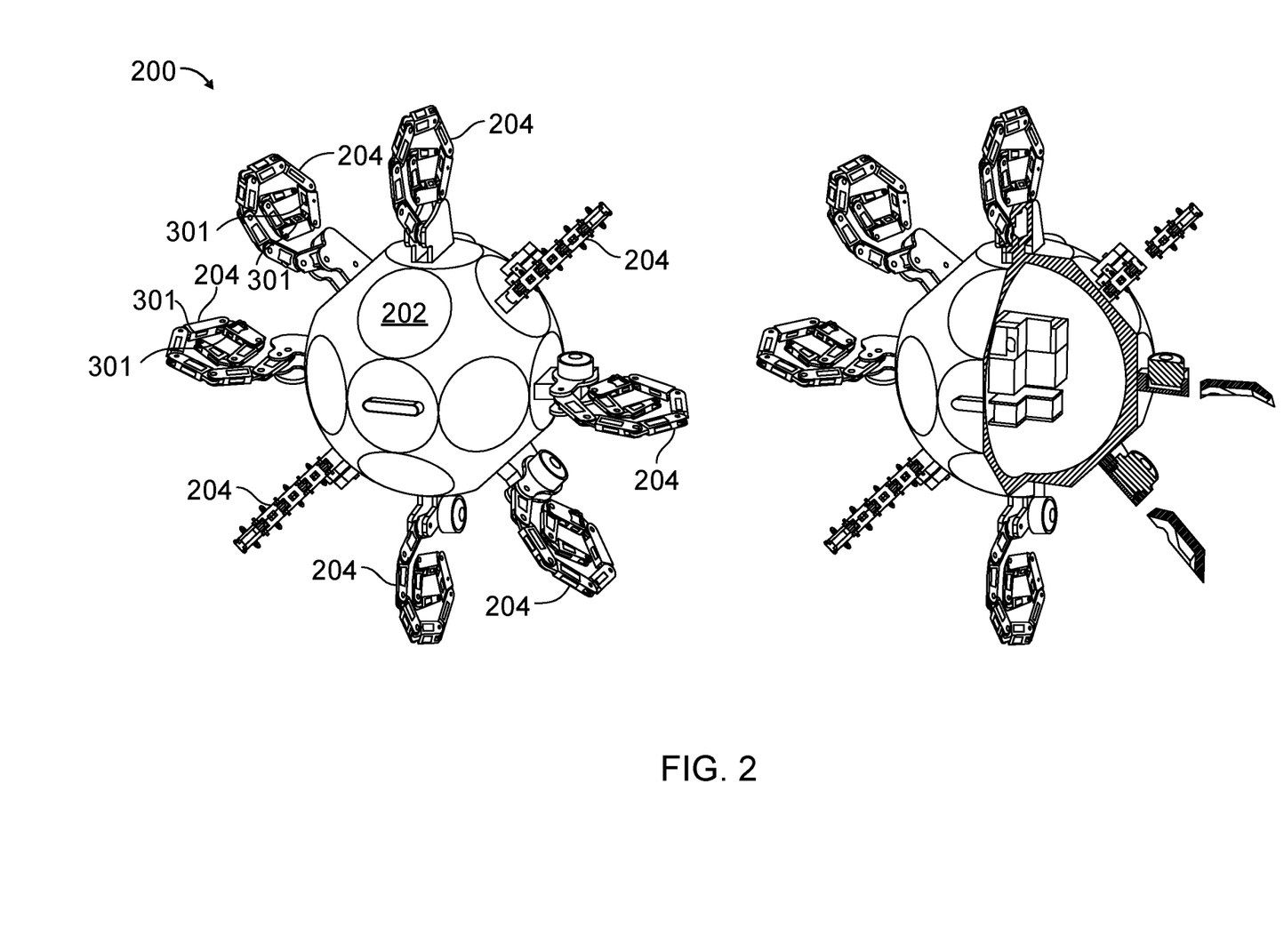
FIG. 2 illustrates example embodiments of a multi-armed robotic capture device in accordance with the systems and methods described herein.
Figure 3:
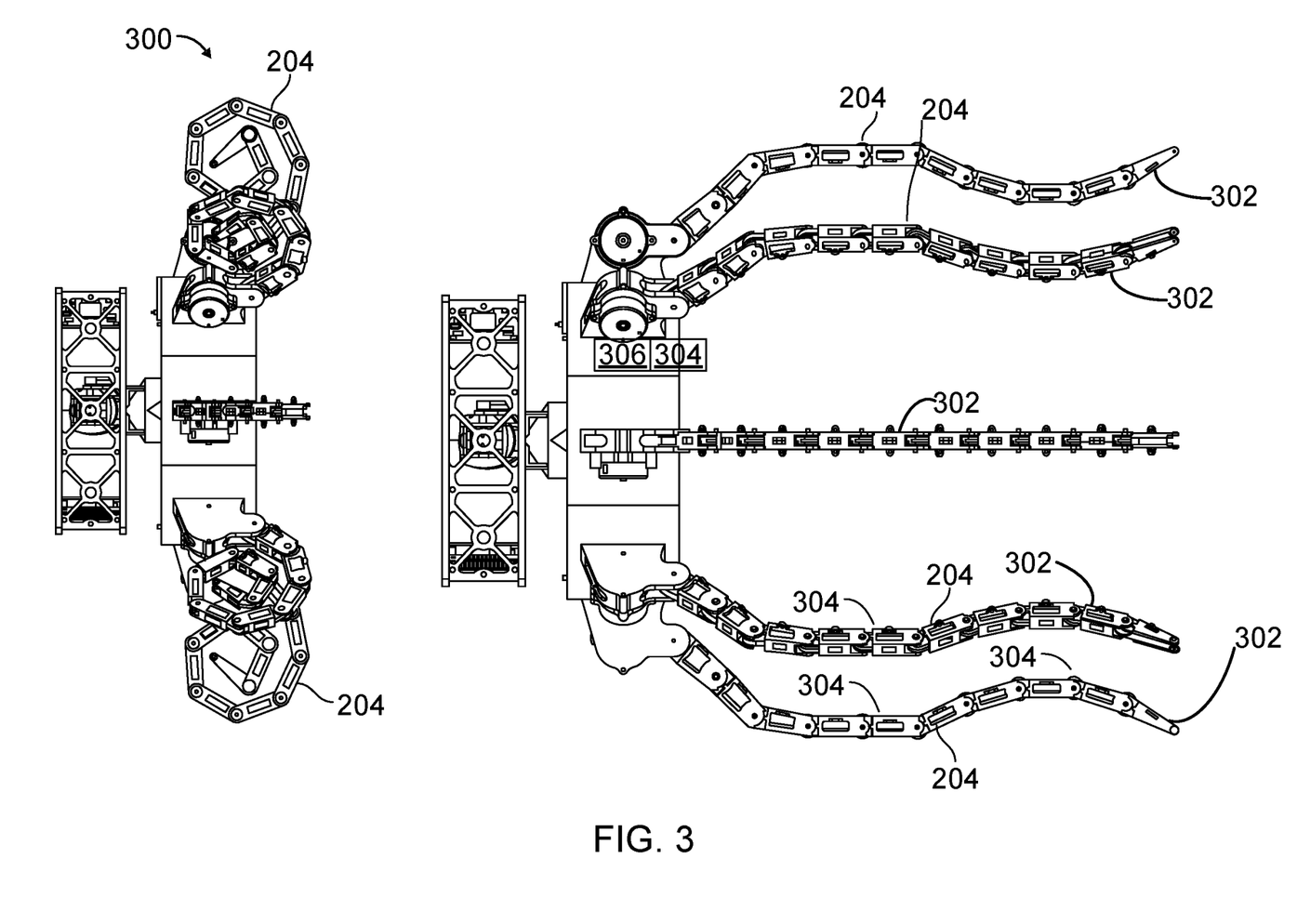
FIG. 3 illustrates example embodiments of a multi-armed robotic capture device in accordance with the systems and methods described herein.
Figure 4:
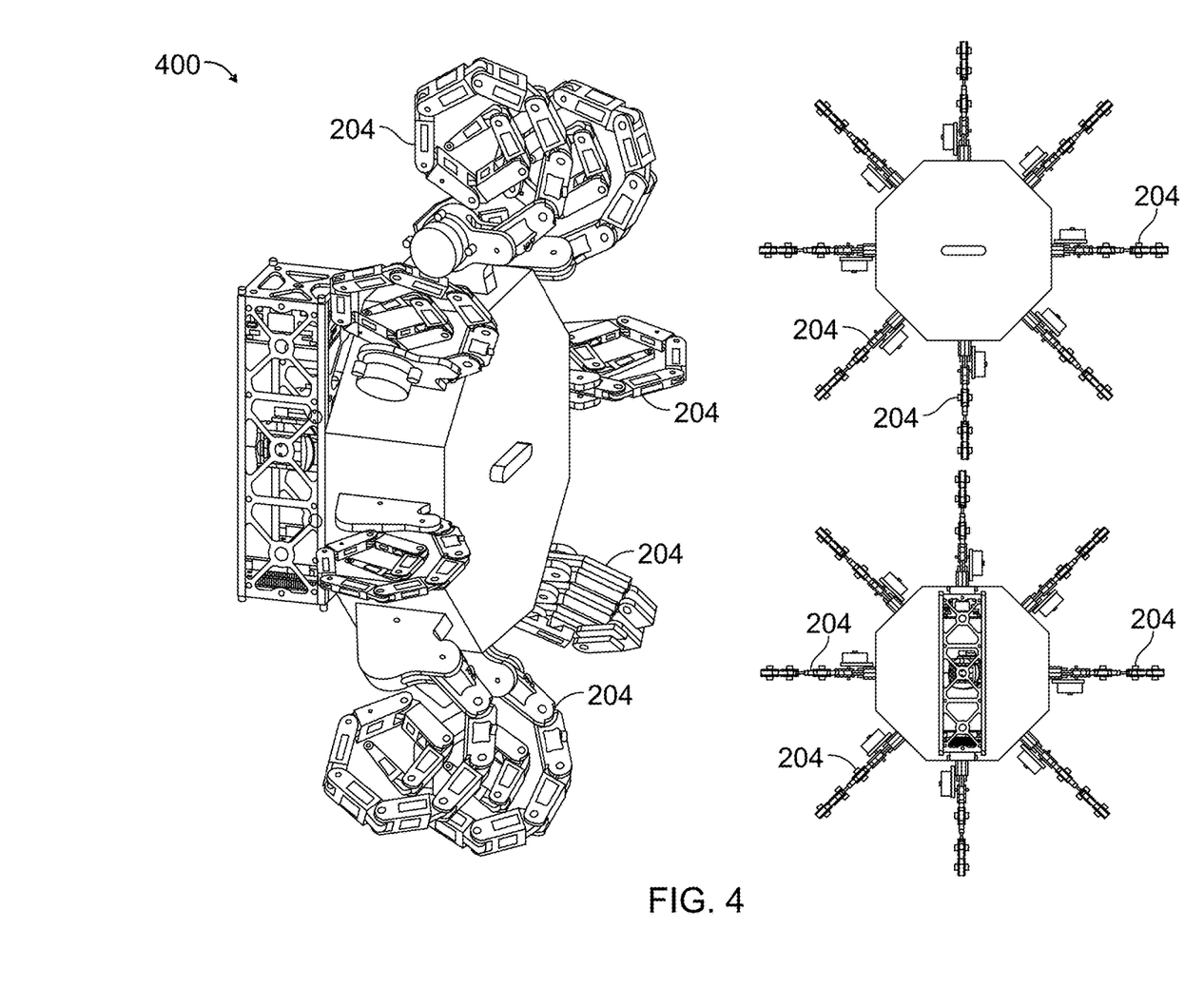
FIG. 4 illustrates example embodiments of a multi-armed robotic capture device in accordance with the systems and methods described herein.

FIGS. 2-4 illustrate example embodiments 200, 300, 400 of a multi-armed robotic capture device 120. As described above, example embodiments of the systems and methods described herein may use a base/body approach. An initial study was executed to examine the most likely contiguous and non-contiguous surfaces expected for a servicing gripper, which defined the initial sizing for length of tentacles. The number of tentacles selected for the illustrated example is eight, which offered dedicated pairs of grasping planes which could support varying geometries. The size and length of the tentacles themselves can be defined by the specific objects designated for capture. In some examples, tentacles may come in multiple lengths within the same device. For example, a multi-armed robotic capture device 120 may have two different length tentacles, e.g., four tentacles of a first length and four tentacles of a second length. Attributes of example tentacles in accordance with the systems and methods described herein are described below.

Electrostatic adhesives function on the principle of utilizing a controlled electrostatic field to generate surface polarization to provide a weak attractive force within a wide variety of substrates. Alternatively, Gecko-like adhesives utilize the principle of Van der Waals to create intermolecular attraction forces based on the generation of a high real-area-of-contact.

In the example embodiments 200, 300, 400 of FIGS. 1-4, a multi-armed robotic capture device 120 may include a base 150 that is configured to attach to a robotic arm 160 or a servicer (e.g., satellite/space station 130) and having a tether 170. The multi-armed robotic capture device 120 may include a body 202 that is coupled to the base 150 via the tether 170. A plurality of tentacles 204 may be coupled to the body 202 and configured to grip a target object, e.g., client 140. The body may generally be sized based on the size of the motors used to operate the tentacles 204. The motors used to operate the tentacles 204 may be selected based on the torque needed to operate the tentacles 204.

A plurality of tiles 301 (FIG. 2) may be positioned on each tentacle 204 of the plurality of tentacles 204 and configured to apply a shear force on the target object (e.g., client 140) to grip the target object using an adhesive force. In an example embodiment, the tiles 301 (FIG. 2) may generally be positioned on an inner portion 302 (FIG. 3) of each tentacle 204 of the plurality of tentacles 204. The tiles positioned on one or more tentacles 204 may use one or more of the active (electrostatic) and passive (Gecko-like) adhesive technologies that were used to create the tiles discussed with respect to FIG. 5.

In an aspect, the base 150 may be configured to release the tether 170 to allow the body 202 to contact the target object (140) a standoff distance away from the robotic arm 160 or the servicer (130), wherein the servicer is a satellite servicer.

In an aspect, the base 150 may be configured to pull or tow the tether 170 to reel or tow the body 202 back to the base 150 after the body 202 has been allowed to contact the target object (e.g., client 140).

In an aspect, the multi-armed capture device 120 may include an elastomeric flexible material, substrate or fabric positioned on each of the plurality of tentacles 204 and in between adjacent tiles of the plurality of tiles, wherein the elastomeric flexible material, substrate or fabric includes electro- and gecko adhesive tiles and is configured to conform or become compliant over and across contiguous and non-contiguous surfaces while still maintaining grasping ability. The elastomeric flexible material, substrate or fabric may be configured to detect elastic deformation and provide a measurement on the shear force.

In an aspect, the plurality of tentacles 204 may be configured to grip any type of target object having any size, shape, configuration, orientation, attitude motion or material of the target object to augment capture ability and minimize risk when capturing the target object even when the target object does not actively participate or comply during capture, wherein the target object is a space object.

In an aspect, the multi-armed capture device 120 may include a sensor 304 configured to detect a shape or a configuration of the target object. The multi-armed capture device 120 may include a controller 306 coupled to the sensor 304 and the plurality of tentacles 204 and configured to control, move or position the plurality of tentacles based on the detected shape or configuration of the target object. An aspect may include a second sensor positioned on each of the plurality of tiles (e.g., on the tentacles 204, such as on the inside 302) and configured to detect the adhesive contact of each tile and thus the shear forces on the target object. The controller 306 may be configured to adjust the position of the plurality of tentacles or the plurality of tiles based on the detected shear forces. In an aspect, a display may be configured to display the position of the plurality of tentacles and the shear forces on the target object. In an aspect, the adhesive is at least one of an electro-adhesive or a gecko adhesive.

In an aspect, the plurality of tentacles 204 includes a first tentacle 204 and a second tentacle 204 that is opposite the first tentacle. The plurality of tiles includes a first set of tiles coupled to the first tentacle 204 and a second set of tiles coupled to the second tentacle 204. The first set of tiles apply a first shear force and the second set of tiles apply a second shear force that opposes the first shear force to grip the target object.

In an aspect, a robotic capture device 120 includes a base 150 that may be configured to attach to a servicer (e.g., satellite/space station 130) and having a tether 170. The robotic capture device 120 includes a body 202 that is coupled to the base 150 via the tether 170. One or more tentacles 204 may be coupled to the body 202 and configured to provide grip to a space object (e.g., client 140). One or more tiles may be positioned on each tentacle 204 of the one or more tentacles 204 (such as on the inside 302 of the tentacles 204) and configured to apply a shear force on the space object to grip the space object using an adhesive. A processor (e.g., controller 306) may be coupled to the base 150, the body 202 and one or more tentacles 204 and configured to move or position the one or more tentacles 204 based on shear forces on the space object.

In an example embodiment, a robotic capture device 120 may include a memory, a wired or wireless communication device, and a power source configured to provide power to move or position the one or more tentacles 204 and reel or tow the body via the tether 170.

In an aspect, the base 150 has a motorized reel (see FIG. 7) that may be configured to release or pull the tether 170 to release or capture the space object (e.g., client 140).

In an aspect, the one or more tiles and the one or more tentacles 204 may be reconfigurable and may be configured to control or adjust an amount of the shear force applied by each of the one or more tiles and each of the one or more tentacles without losing the grip of the space object, wherein the one or more tiles are configured to be turned on or turned off to make a soft or hard contact to grab the space object (e.g., client 140).

In an aspect, the processor (e.g., controller 306) may be configured to control the shear forces on the space object. In an aspect, the tether 170 may be approximately 25-35 meters long, however, other lengths may also be used. Any length that may allow the body to standoff from the servicer at a standoff distance of approximately 25-35 meters (or other lengths that may be appropriate).

In an aspect, a robotic capture system 120 may include a camera (e.g., sensor 304) or a laser range finder (e.g., sensor 304) configured to determine a distance to the space object (e.g., client 140), a shape of the space object (e.g., client 140) or a size of the space object (e.g., client 140). The processor (controller 306) may be configured to control deployment of the body 202 to the space object (e.g., client 140) based on the distance, the shape, or the size of the space object (e.g., client 140).

Figure 5:
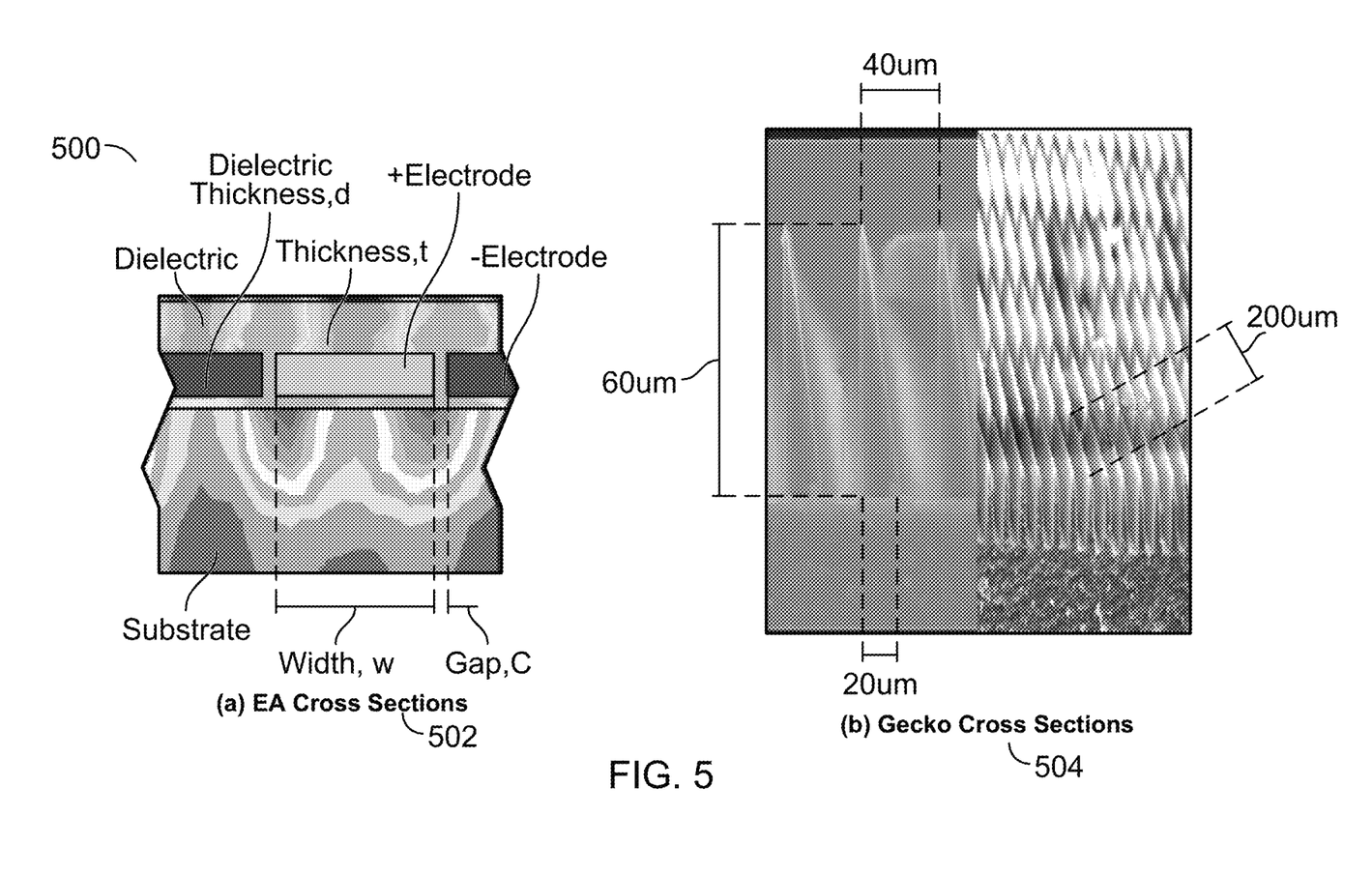
FIG. 5 illustrates example embodiments of both the active (electrostatic) and passive (Gecko-like) adhesive technologies that were used to create the tiles in accordance with the systems and methods described herein.

FIG. 5 illustrates examples 500 of both the active (electrostatic) 502 and passive (Gecko-like) 504 adhesive technologies that were used to create the tiles. EA functions by utilizing a high voltage differential across a set of inter-digital electrodes to generate a strong local electric field. This electric field polarizes the surface material creating a surface charge buildup and thus adhesion. EA is used in the semiconductor industry, the printing industry, in the food and painting industry for powder coating, and in the robotics industry as attachment mechanisms. The advantage of electrostatic adhesion is that it generates an adhesive force on a wide variety of surfaces ranging from glass and steel to rougher surfaces such as wood and concrete. This is in contrast to other adhesion methods such as micro-spines, suction, electromagnetic, and other techniques that can be very surface specific. The disadvantages of electrostatic adhesives are that the adhesion level is relatively weak and is highly dependent on the separation gap between the adhesive and target substrate. EA is shown to be one of the more robust attachment mechanisms since it is both controllable and effective over a variety of surface roughness-es and compositions including conductors, semi-conductors, and insulators. Electrostatic adhesives are especially promising for space applications because they can operate in a vacuum, do not utilize chemical bonds, and may require no preload force on the target surface.

Gecko or dry adhesives are based, literally, on behavior traits of geckos. The adhesive consists of a micro-structure surface which is used to create a large real-area-of-contact with a substrate and generate adhesion through Van der Waals forces. Two different varieties of dry adhesive generally exist; non-directional and directional dry adhesives. Non-directional dry adhesives typically consist of micro-scale straight vertical stalks with a mushroom shaped tip to provided improved contact area. They typically generate high adhesion on very smooth surfaces but are not controllable and lack confirmation rough surfaces. Directional gecko-like adhesives, on the other hand, are typically asymmetric structures which deform to provide geometric local compliance with the target surface and generate adhesion when loaded in a preferred direction. Load sensitivity of the adhesive provides a form of ON/OFF control and greater micro-scale surface conformation. The directional dry adhesive to be used in the proposed work has been developed at JPL and consists microscopic triangular wedges about 20 μm wide at their base, 60 μm-70μ tall, and about 200 μm long. The adhesive or wedges have directionality in that they use asymmetric micro-structured hairs (the wedges) that bend to create a high area of contact when loaded in preferred shear direction.

To utilize the best of both adhesion mechanisms, a hybrid combination of Electrostatic adhesion (or EA) and Gecko-like adhesion has been shown to increase shear force applied to any object and multiple substrates. The electrostatic adhesive provides initial clamping to the target surface and allows for macro scale surface conformation due to the generated attraction force and flexibility of the EA film. This high surface contact then allows a significant percentage of the gecko-like adhesive hairs to engage with the target substrate when loaded. As the gecko-like adhesive hairs engage the micro-scale surface conformations they reduce the gap distance between the EA and substrate, further increasing its effectiveness. This interaction provides the synergistic effect that enables greater overall adhesion, which is often greater than the sum of the individual adhesives.

Space suitable fabrics were surveyed to identify an appropriate material for prototyping and testing the flexible spine, based on their ability to stretch, to deform, and their space heritage. Spandex and Dacron were chosen as principle materials for our first consideration as the elastic material to merge with the adhesive technology. The team created multiple swatches of stretchable material with different geometries of tiles attached in the stretch and cross stretch area. In addition, we reached out to a commercial company, StretchSense, to merge their unique sensing techniques into the fabric swatches.

To mimic actual deployment on a Client surface, we created a simple benchtop test layout to test and validate swatches. In this layout, a glass surface was setup to be the test surface, a pulley was used to enable vertical loading, a single axis load cell was used to measure line load, with masses hung from the line to load the swatches. To load the fabric swatch, a metal bracket was manufactured and riveted onto its base, a hook would then run a line from the bracket, over the pulley connecting the load cell. A total of five different swatch configurations were designed and manufactured, each having a different number and arrangement of tiles on the flexible surface. The objective with the varied design was to identify a suitable pattern for placement of tiles and to compare overall performance of a given switch design.

A common trend observed during initial integrated swatch (stretchable fabric with EA/G tiles) research testing was that the tiles on the bottom (closest to the bracket and load) would fail first. This occurred because they would bear most of the applied load, thus preventing an equal distribution among the other tiles. This behavior suggested progressive load transfer, that is, tiles lower in the chain would fail prior to ones higher up in the chain and led us to alter the tile layout to distribute the load. This would more evenly spread the load and thus take advantage of the compliance in the stretchable material.

Due to the extensive number of possible tile arrangements on each tentacle, a computer simulation was created to explore a wider variety of patterns and inform design selections. Initial results created a baseline for three tiles arranged in parallel vs series, with results similar to experimental findings, providing validation that a parallel configuration is superior. In addition, through simulation, we were able to model the added dynamics associated with flexible fabric attached to the tiles on the spines.

To provide the control and support to the flexible swatch tentacles the team settled on utilizing an in-extensible spine for each tentacle that can accept the connection of the EA/G tiles embedded in fabric to its front face. Below are the two main requirements established for some embodiments for the tentacle/gripper arm design: The use of a backing element to provide effective load transfer from each individual EA/G tile to the base of the tentacle. Serve as both actuation and retraction mechanisms and a stretch sense element between each tile and the spine to allow for load sharing from tile to tile while also enabling force sensing when used with the stretch sense elements. Be in parallel compliance for maximum shear transfer. Be in series compliance to overcome load sharing challenges To achieve this, two prototypes were made: a film-based structure termed the continuous gripper and a set of jointed rigid mechanical links termed the segmented gripper. Each provide a unique grip, adhesive platform, and implementation attribute which led to the concurrent development of both designs during the project. Table 1 below is a brief overview of some the identified pros/cons for each tentacle design.

TABLE 1

Gripper prototype design tradeoffs

| Spine Type | Pro | Con |
| --- | --- | --- |
| Continuous | Made from primarily soft elements<br>Tugs and pulls target into gripper<br>Potential for compact stowage if rolled onto a drum | Lower overall surface conformation<br>Adhesion is only at the end pad<br>Complex stowage mechanism may be required to effectively allow deployment and actuation |
| Segmented | Excellent conformation to centi-meter scale surface geometries<br>High overall grip strength | Many mechanical components<br><br>May required constant cable tension to keep cable on pulleys<br>Can push away from target when perpendicular to large flat surfaces |

The continuous tentacle design consists of a flexible but in-extensible plastic film that is actuated by a thin super-elastic metal wire. It is possible that future versions would use a flex PCB circuit in place of the film to provide both support and electrical wire routing throughout the structure for signal and high voltage.

In an embodiment, a flexible tentacle with segmented tubing to route a flexible, extensible rod from one end to the other was created. By varying the distance between the tubing and tentacle substrate we found that we can tune the stress/strain profile and thus the curling angle of the tentacle. This proved out the general concept and enabled more detailed prototypes.

In another embodiment, a 3-level hierarchy of wire springs and spring-loaded films combined with a large end pad similar to a long squid tentacle. The pad on the end was then outfitted with tiles in a parallel geometry to enable a much higher end grip shear force applied to a surface. The stiffest wire generates curling of the lower half of the tentacle and serves to force the end pad to engage with the target surface. In, operation the tentacle is effectively a bimorph material, where the Polyethylene terephthalate (PET) base substrate material (clear/white) is inextensible while the wire increases in length by sliding extra wire through the guides secured to the tentacle substrate and placing the substrate in tension. Due to this action, the tentacle is forced to curve as a result.

A softer pair of wire springs enable the flared pad of the tentacle to conform to a range of surfaces topology. These softer wires connect the tip of the toe to the stiffest wire, and extension of the stiffest wire also causes the softer wires to tension the toe and further pressing it into any nearby surfaces. Finally, the softest pair of wire springs is used to spring-load adhesive flaps that will eventually hold the EA/G material. This allows individual flaps to better conform to a surface.

The segmented tentacle spine design consists of a set of rigid links connected by pin joints to create a highly compliant structure in spite of using rigid elements. For movement, through careful design of the internal pulley configuration, the tentacle can be actuated with a base-to-tip unrolling action while also retracted with a tip-to-base action. This allows the tentacle to unroll and conform to surface along the way while also being able to naturally roll back up for stowage.

Figure 6:
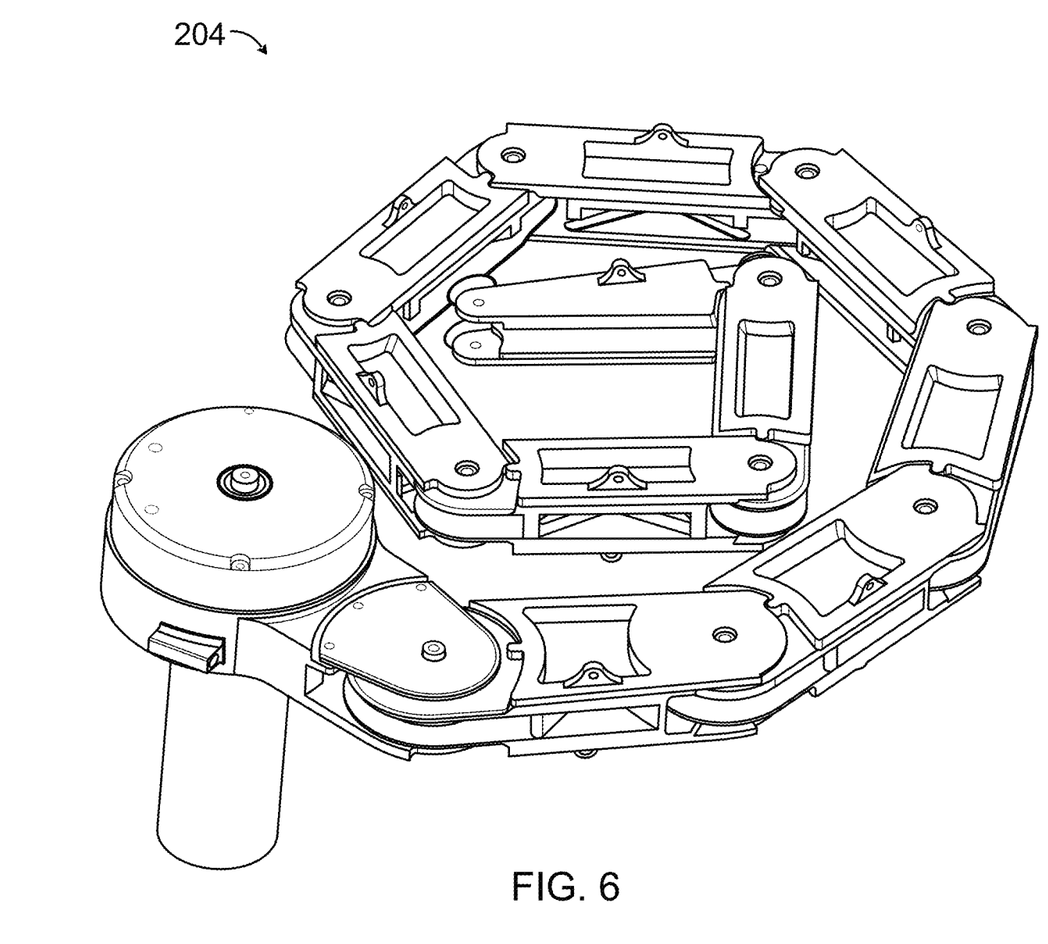
FIG. 6 illustrates an exemplary Hirose-based tentacle in accordance with the systems and methods described herein.

FIG. 6 illustrates an exemplary Hirose-based tentacle 204 in accordance with the systems and methods described herein. In an embodiment using the Hirose-based tentacle acted as an initial proof concept (FIG. 6). It was able to demonstrate the basic concept of unrolling deployment and generic surface conformation but exhibited a number of issues which prevented it from being truly functional. Additionally, the spring retraction proved to be too weak and did not provide sufficient force to roll up the tentacle. This limited us to testing only the engagement capabilities. Also, the internal pulleys were all the same diameter causing uneven surface force and buckling of the tentacle after making full contact. Finally, the fabrication approach proved insufficient as only plain bearings were used with relatively flexible links. This caused the tentacle to exhibit excessive deflection under gravity while the joint friction limited actuation effectiveness.

An embodiment corrected many of the issues found in the first design and proved to be the first truly functional prototype. Most notably, a much stronger return spring mechanism was designed using rotor spring to allow proper retraction of the tentacle. Rigid hard stops were added for retraction to allow the tentacle to curl up in an organized spiral pattern for its fully retracted state. The goal was to have the segmented tentacle deploy from base to tip, retract from tip to base, and provide even surface pressure when deployed.

Another embodiment saw the introduction of an overhauled mechanical link design that proved a much higher stiffness and introduced low friction shield ball bearings at all of the joints. This significantly reduced jointed friction which improved actuation and retraction consistency. Additionally, the out of plane stiffness was greatly enhanced allowing longer lengths (currently 65 cm) to be used under 1 G conditions.

Figure 7:
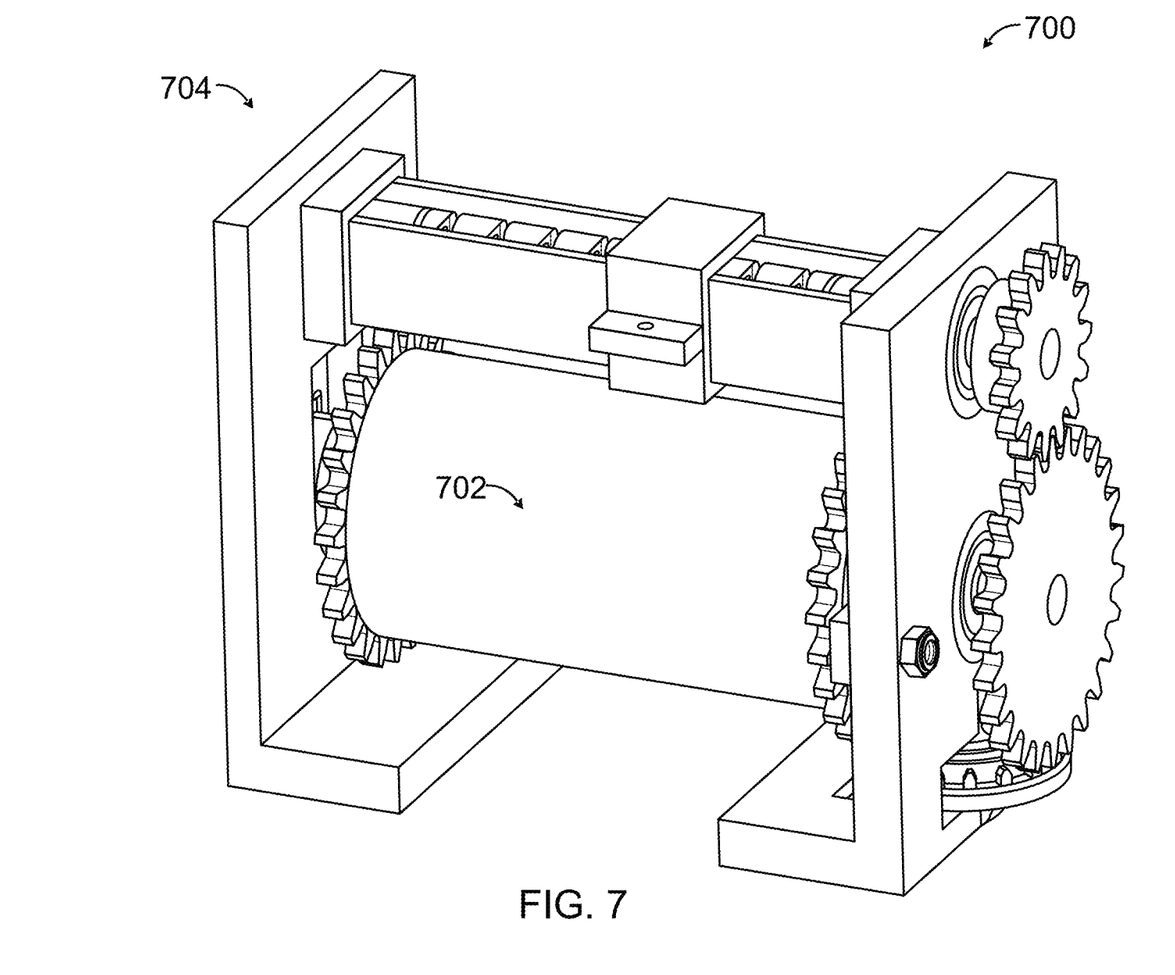
FIG. 7 illustrates an exemplary body retraction mechanism in accordance with the systems and methods described herein.

FIG. 7 illustrates an exemplary body retraction mechanism 700 in accordance with the systems and methods described herein. To retract the body mechanism back to its base after successfully contacting the Client, a motorized tether module was designed to support very low acceleration force application. An initial design of retract the body mechanism, as illustrated in FIG. 7, may use a motorized shaft 702 mounted on a pedestal 704 to apply a torque, a level wind screw to manage spooling of the line and appropriate gear heads to transfer power. This module will share electronics and power with the robotic arms, corresponding lines will run from the aft section of the Servicer spacecraft to the location of our control system. A KEVLAR line with a high strength to weight ratio is envisioned to be used as the tether. Preliminary calculations were made to predict the force needed to begin an acceleration with a commensurate velocity for a 2000 kg Client object in space, as an example. A base reel would need only micro-Force to initiate acceleration that maintains a very slow velocity movement from Client to Servicer. The next requirement for some embodiments, is an automated slack sensing system to avoid increasing the force through micro-accelerations or tugs as it reels in. An additional construct of frictionless payout may be needed as the body moves away from the base on the way to the Client, where the reel should not impose friction or drag on its movement. This may need an autonomous payout system that constantly extends more line than the current range from the base and body are, until it slows at the Client. These types of requirements may include in future work on an example tether system in accordance with the systems and methods described herein.

Figure 8:
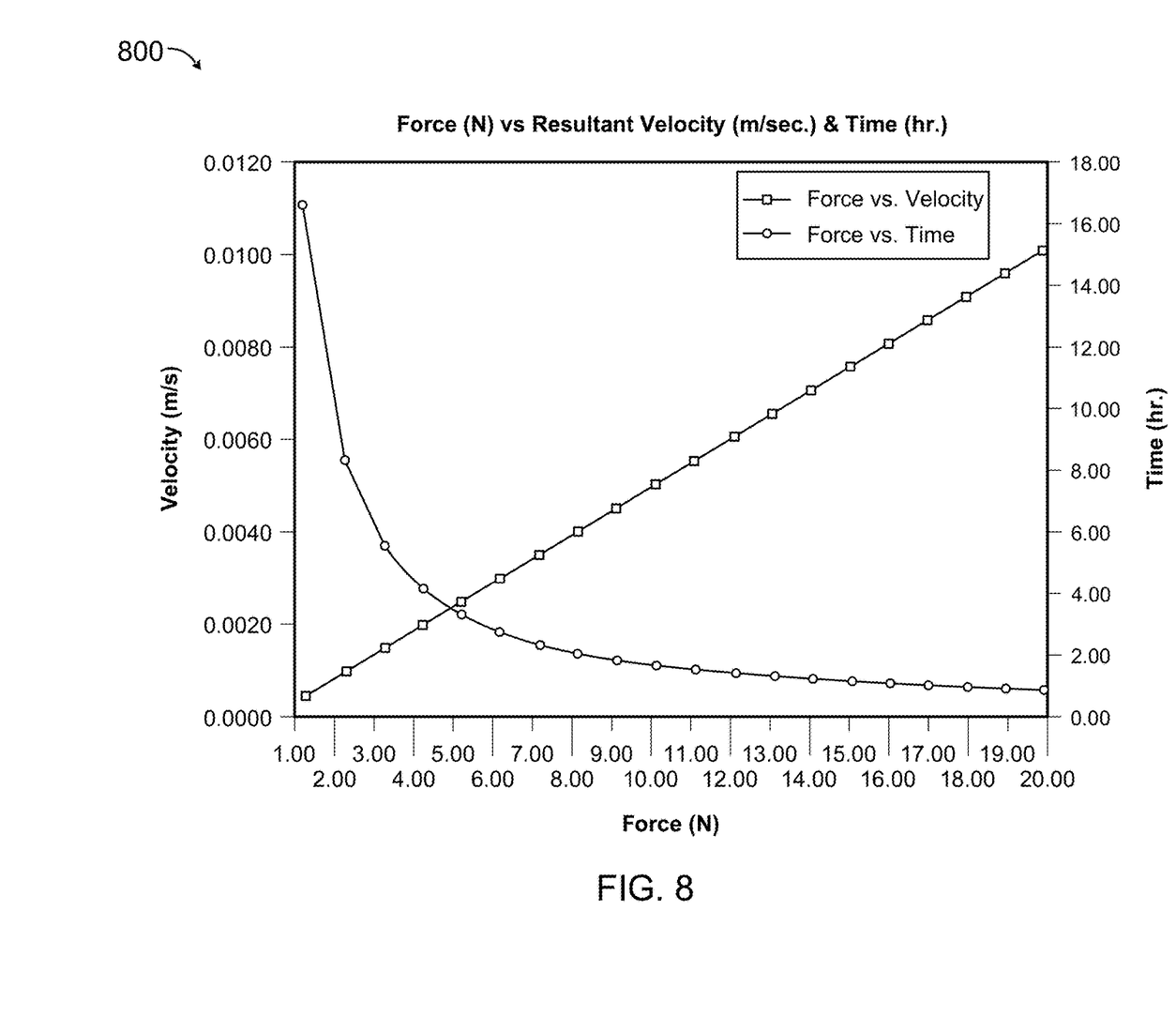
FIG. 8 illustrates exemplary force versus resultant velocity curves.

FIG. 8 illustrates exemplary force versus resultant velocity curves 800. A tether force translation to velocity of client analysis studies tether/client dynamics. Calculations may be made with various assumptions. As an example, the assumptions for the illustrated example of FIG. 8 may be a Client mass 2000 kg. A force provided by a tether attached to an arm may be as low as possible for joint motors. The force provided may be seen as an instantaneous micro-acceleration. The resultant velocity is from 1 second of acceleration. The resultant velocity may dependent upon instantaneous force inputs.

Figure 9:
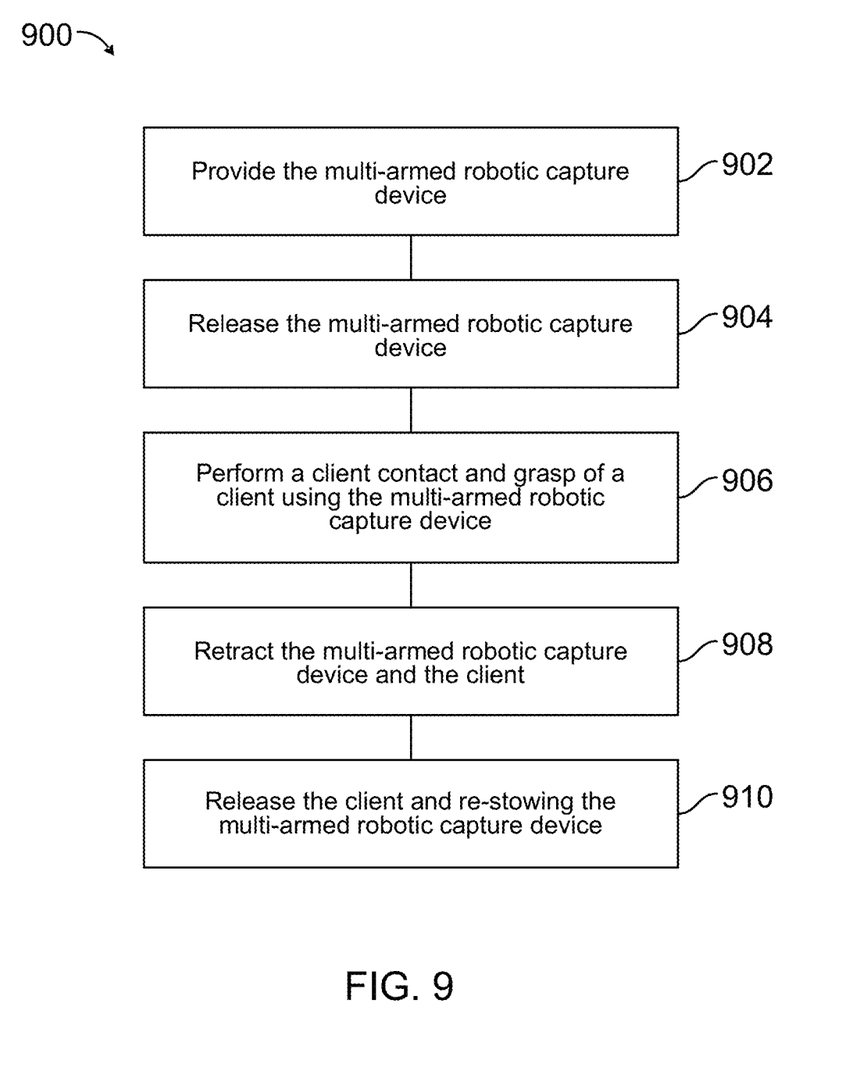
FIG. 9 is a flowchart illustrating an example method 900 of a multi-armed robotic capture device in accordance with the systems and methods described herein.

FIG. 9 is a flowchart illustrating an example method 900 of a multi-armed robotic capture device in accordance with the systems and methods described herein. The method 900 includes providing the multi-armed robotic capture device (902). The multi-armed robotic capture device includes a base that is configured to attach to a robotic arm or a servicer and having a tether, a body that is coupled to the base via the tether, a plurality of tentacles coupled to the body and configured to grip a target object, and a plurality of tiles positioned on each tentacle of the plurality of tentacles and configured to apply a shear force on the target object to grip the target object using an adhesive force.

The method 900 includes releasing the multi-armed robotic capture device (904) an example of which is illustrated in FIG. 1 at release 104.

The method 900 includes performing a client contact and grasp of a client using the multi-armed robotic capture device (906) an example of which is illustrated in FIG. 1 at release 106.

The method 900 includes retracting the multi-armed robotic capture device and the client (908) an example of which is illustrated in FIG. 1 at release 108.

Optionally, the method 900 includes releasing the client and re-stowing the multi-armed robotic capture device (910) an example of which is illustrated in FIG. 1 at release 110.

A fundamental technology for a new type of mechanical grappling tool for space has been developed. REACCH or Reactive ElectroAdhesive Capture Cloth is an "octopus gripper" may use a mergence of electro-adhesive and gecko adhesive into an elastomeric substrate, which can then be embedded into articulated robotic spines. The mergence of the flexible, stretchable substrate with EA/G "tiles" is particularly adept for on-orbit grasping technology because of its ubiquitous geometric complaint grasp and natural capability to dampen and absorb orbital body attitude motion upon contact. The stretchable fabric can conform over and across contiguous and non-contiguous surfaces while still maintaining grasping ability. This material can repeatedly flex and stretch without losing its integrity. The stretchable fabric can also be manufactured in specific geometries based on end use case that allow natural linear motion in any direction to extend the fabric, while providing stiffness in designated directions for load transfer.

The unique mergence of the stretchable substrate with active/passive adhesive technology (EA+Gecko) enables structured tentacles to absorb energy using the fabric elasticity, extend the adhesive capability of the active electro-adhesive activated tiles by maintaining the integrity of the electrical circuitry, and provide a mechanism to generate unique sensor data about the grasping performance that provide feedback to help better control the grip and adhesion.

Electrostatic adhesives function on the principle of utilizing a controlled electrostatic field to generate surface polarization to provide a weak attractive force with a wide variety of substrate. Alternatively, Gecko-like adhesives utilize the principle of Van der Waals to create inter molecular attraction forces based on the generation of a high real area of contact.

EA functions by utilizing a high voltage differential across a set of interdigital electrodes to generate a strong local electric field. This electric field polarizes the surface material creating a surface charge buildup and thus adhesion. EA is used in the semiconductor industry, the printing industry, in the food and painting industry for powder coating, and in the robotics industry as attachment mechanisms. The advantage of electrostatic adhesion is that it generates an adhesive force on a wide variety of surfaces ranging from glass and steel to rougher surfaces such as wood and concrete. This is in contrast to other adhesion methods such as micro-spines, suction, electromagnetics, and others techniques that can be very surface specific. The disadvantages of electrostatic adhesives are that the adhesion level is relatively weak and is high dependent on the separation gap between the adhesive and target substrate. EA is shown to be one of the more robust attachment mechanisms since it is both controllable and effective over a variety of surface roughnesses and compositions including conductors, semi-conductors, and insulators. Electrostatic adhesives are especially promising for space applications because they can operate in a vacuum, do not utilize chemical bonds, and may require no preload force on the target surface.

"Gecko" or dry adhesives are based literally, on behavior traits of geckos. The "adhesive" consists of a microstructure surface which is used to create a large real area of contact with a substrate and generate adhesion through Van de Waals forces. Two different varies of dry adhesive generally exist; non-directional and directional dry adhesives. Non-directional dry adhesives typically consist of microscale straight vertical stalks with a mushroom shaped tip to provided improved contact area. They typically generate high adhesion on very smooth surfaces but are not controllable and lack confirmation rough surfaces. Directional gecko-like adhesive son the other hand are typically asymmetric structures which deform to provide geometric local compliance with the target surface and generate adhesion when loaded in a preferred direction. Loads sensitivity of the adhesive provides a form ON/OFF controllability and greater micro-scale surface conformation. The directional dry adhesive to be used in the proposed work has been developed at JPL and consists microscopic triangular wedges about 20 um wide at their base, 60-70 um tall, and about 200 um long. The adhesive or wedges have directionality in that they use asymmetric micro-structured hairs (the wedges) bend to create a high area of contact when loaded in preferred shear direction.

To utilize the best of both adhesion mechanisms, a hybrid combination of Electrostatic adhesion (or EA) and Gecko-like adhesion has been shown to increase shear force applied to any object and multiple substrates. This is achieved with the EA/G through a synergistic relationship between these two primary adhesive mechanisms. The electrostatic adhesive provides initial clamping to the target surface and allows for macro scale surface conformation due to the generated attraction force and flexibility of the EA film. This high surface contact then allows a significant percentage of the gecko-like adhesive hairs to engage with the target substrate when loaded. As the gecko-like adhesive hairs engage the provide micro-scale surface conformation and reduce the gap distance between the EA and substrate further increasing its effectiveness. This interaction provides the synergistic effect that enable greater overall adhesion which often greater than the sum of the individual adhesives.

The fabric elastic adhesive surface is further integrated with a stretch sensing material that enables the characterization of adhesion, in particular by measuring the elastic deformation of the fabric. This quantifiable output can be read electronically to calibrate the adhesive technology against shear performance and provide indications of slip and breakaway movement, which makes for increased grip and non-damage performance to any surface that the gripper would attach to.

E-textiles have seen great advances in embedded electronics and smart textiles provide for creating highly flexible sheets that can embed the interstitial spacing to accuracy levels in 2 dimensions and support efficient creation of the electro-static fields. E-textiles are fabrics that feature electronics and interconnections woven into them, presenting designed physical flexibility through the weave structure and typical size that cannot be achieved with other existing electronic manufacturing techniques. Components and interconnections are intrinsic to the fabric and thus are less visible and not susceptible of becoming tangled or snagged by surrounding objects. E-textiles can also more easily adapt to fast changes in the computational and sensing needs of any specific application, this one representing a useful feature for power management and context awareness. A fabric circuit board (FCB) may have integrated copper wiring and circuitry that can flex, stretch, be shot at, and go through repeated washes without losing its electrical integrity. The textile was made with pre-stretched elastic yarn and polyurethane-coated copper fibers that were combined using a digital knitting machine. Stretchable fabrics can be created in geometries that allow natural linear motion in any direction to extend, thus providing a natural spring damper and conforming to any geometry while also providing stiffness in designed directions for load transfer.

Another potential modality for creating flexible EA is in wearable electronics. Wearable electronics are hypoallergenic electronic sensors that can be worn on the skin continuously for a week without discomfort, and are so light and thin that users forget they even have it on. The elastic electrode constructed of breathable nanoscale meshes holds promise for the development of noninvasive e-skin devices that can monitor a person's health continuously over a long period.

The primary downside of this concept is the lack of breathability, with current EA manufacturing techniques, which is deemed unsafe for long term use on skin. Never less, it can very interesting for space applications where the ultrathin films and sheets used in these devices could provide extreme conformance. It remains to be seen if the electrode construction from nanoscale mesh that contain a water-soluble polymer, polyvinyl alcohol (PVA), and a gold layer—materials considered safe and biologically compatible with the body, can translate to fabrication onto space rated fabrics.

An additional vision behind wearable computing foresees future electronic systems to be an integral part of our everyday outfits. Such electronic devices have to meet special requirements concerning wearability. Wearable systems will be characterized by their ability to automatically recognize the activity and the behavioral status of their own user as well as of the situation around her/him, and to use this information to adjust the systems' configuration and functionality. This translates into "smart" fabrics, which potentially could adjust the electrical effect to correspond to the user's needs or environment.

The final key application that can use integrated unique deployment of a flexible EA/G fabric is space-based robotics. Multiple examples of robotic manipulation systems are currently being worked today with plans for deployment on standalone spacecraft shortly. While the robotic arms themselves are the primary method to cross limited distance between two objects in space, they offer the ability to both deploy a flexible fabric and to enable a subset of flexible "fingers" that act as grippers on an end effector.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A multi-armed robotic capture device, comprising:
   a base that is configured to attach to a robotic arm or a servicer and having a tether;
   a body that is coupled to the base via the tether;
   a plurality of segmented tentacles each comprising jointed rigid mechanical links connected by joints and coupled to the body, wherein the plurality of segmented tentacles articulate to grip a target object; and
   a plurality of tiles positioned on each tentacle of the plurality of tentacles and configured to apply a force on the target object to grip the target object.

2. The multi-armed capture device of claim 1, wherein the base is attached to the servicer, wherein the base is configured to release the tether to allow the body to contact the target object a standoff distance away from the servicer, and wherein the servicer is a satellite servicer.

3. The multi-armed capture device of claim 1, wherein the base is configured to pull or tow the tether to reel or tow the body back to the base after the body has been allowed to contact the target object.

4. The multi-armed capture device of claim 1, further comprising:
   a first sensor configured to detect a shape or a configuration of the target object; and
   a controller coupled to the first sensor and the plurality of segmented tentacles and configured to:
      control, move or position the plurality of segmented tentacles based on the detected shape or configuration of the target object.

5. The multi-armed capture device of claim 1, wherein the force is at least partially applied by an adhesive comprising at least one of an electro-adhesive or a gecko adhesive.

6. The multi-armed capture device of claim 1, wherein the plurality of segmented tentacles includes a first segmented tentacle and a second segmented tentacle that is opposite the first segmented tentacle, wherein the plurality of tiles include a first set of tiles coupled to the first segmented tentacle and a second set of tiles coupled to the second segmented tentacle, wherein the first set of tiles apply a first force and the second set of tiles apply a second force that opposes the first force to grip the target object.

7. A robotic capture device, comprising:
   a base that is configured to attach to a servicer and having a tether;
   a body that is coupled to the base via the tether;
   two or more segmented tentacles coupled to the body and configured to provide grip to a space object, wherein each of the two or more segmented tentacles comprises jointed rigid mechanical links connected by joints and coupled to the body, wherein the segmented tentacles articulate to grip the space object;
   one or more tiles positioned on each segmented tentacle of the two or more segmented tentacles and configured to apply a force on the space object to grip the space object using an adhesive; and
   a processor configured to:
      move or position the two or more segmented tentacles.

8. The robotic capture device of claim 7, further comprising:
   a memory;
   a wired or wireless communication device; and
   a power source configured to provide power to move or position the two or more segmented tentacles and reel or tow the body via the tether.

9. The robotic capture system of claim 7, wherein the base has a motorized reel that is configured to release or pull the tether to release or capture the body.

10. The robotic capture system of claim 7, wherein the one or more tiles and the two or more segmented tentacles are reconfigurable and are configured to control or adjust an amount of the force applied by each of the one or more tiles and each of the two or more segmented tentacles without losing the grip of the space object, wherein the one or more tiles are configured to be turned on or turned off to make a soft or hard contact to grab the space object.

11. The robotic capture system of claim 7, wherein the processor is configured to control the forces on the space object.

12. The robotic capture system of claim 7, wherein the tether is approximately 25-35 meters long and allows the body to standoff from the servicer at a standoff distance of approximately 25-35 meters.

13. The robotic capture system of claim 7, further comprising:
- a camera or a laser range finder configured to determine a distance to the space object, a shape of the space object or a size of the space object;
- wherein the processor is configured to:
- control deployment of the body to the space object based on the distance, the shape or the size of the space object.

14. A method of a multi-armed robotic capture device, comprising:
- providing the multi-armed robotic capture device including a base that is configured to attach to a robotic arm or a servicer and having a tether, a body that is coupled to the base via the tether, a plurality of segmented tentacles each comprising jointed rigid mechanical links connected by joints and coupled to the body, wherein the plurality of segmented tentacles articulate to grip a target object, and a plurality of tiles positioned on each segmented tentacle of the plurality of segmented tentacles and configured to apply a shear force on the target object to grip the target object using an adhesive force;
- deploying the body of the multi-armed robotic capture device from the base;
- performing a client contact and grasp of a client using the plurality of segmented tentacles of the multi-armed robotic capture device; and
- retracting the body of the multi-armed robotic capture device and the client by the tether.

15. The method of claim 14, further comprising releasing the client and re-stowing the multi-armed robotic capture device.

16. The method of claim 14, wherein the base is attached to the servicer, wherein the base is configured to release the tether to allow the body to contact the target object a standoff distance away from the servicer, and wherein the servicer is a satellite servicer.

\* \* \* \* \*